Dec. 8, 1964   J. R. BERRY   3,160,111
PUMPING SHOCK ABSORBER
Filed Aug. 17, 1962

Joe R. Berry
INVENTOR.

BY C. P. Moffee
Atty.

United States Patent Office 3,160,111
Patented Dec. 8, 1964

3,160,111
PUMPING SHOCK ABSORBER
Joe R. Berry, 1418 W. 23rd St., Odessa, Tex., assignor of one-half to Lowell Davis, Odessa, Tex.
Filed Aug. 17, 1962, Ser. No. 217,696
4 Claims. (Cl. 103—202)

This invention relates to deep well pumps and more particularly to a shock absorber mounted between the crossbar and rod of such pump.

In pumping oil from a deep well, there is often a problem of shock upon the rod. This shock can be caused from many sources such as a gas lock or other things. Of course, these shocks are detrimental to the equipment and are to be avoided if possible.

An object of this invention is to provide a shock absorber for the rods of deep well pumps.

Another object of this invention is to provide such a shock absorber having hydraulic and pneumatic systems with a variable amount of gas in the pneumatic system, thus providing for a "softer" or "harder" shock absorber.

A further object is to provide a system whereby there is provided a source of pulsating gas pressure for auxiliary uses.

A further object of this invention is to provide such a system whereby the strain on the rod may be readily determined from the amount of gas pressure in the system.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, the different views of which are not necessarily to the same scale, in which.

Figure 1:
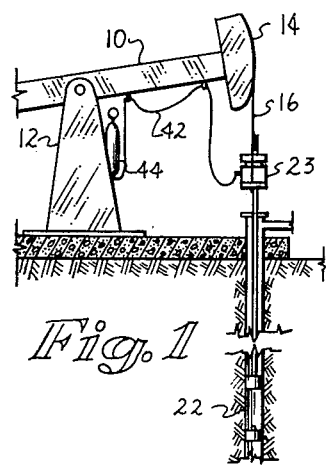
FIG. 1 is a sectional view, partially schematic showing the general arrangement of the parts according to this invention.
Figure 2:
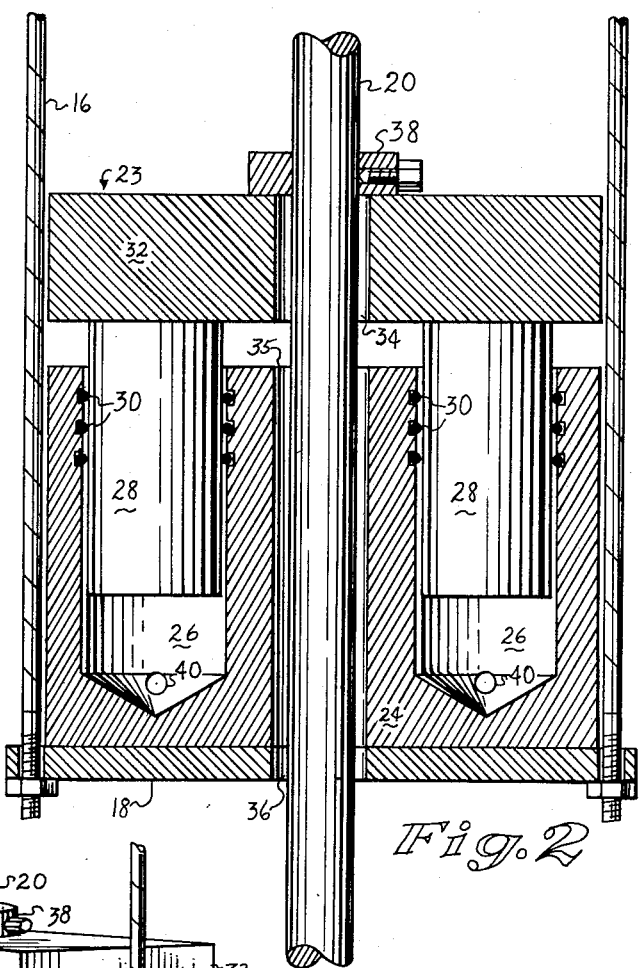
FIG. 2 is an axial sectional view showing part of a shock absorber according to this invention.
Figure 3:
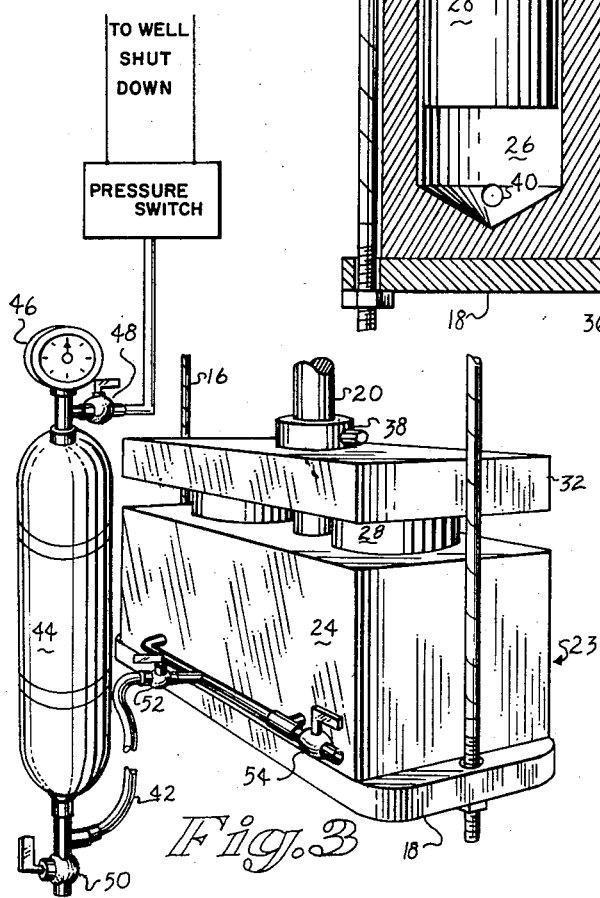
FIG. 3 is a perspective view showing a shock absorber according to this system.

FIG. 1 shows the general environment wherein this shock absorber will be located. It shows a typical pumping unit with walking beam 10 pivoted to post 12. The walking beam 10 is oscillated by a mechanism not shown which causes horsehead 14 to reciprocate. The reciprocation of the head 14 reciprocates bridle 16 which through horizontal crossbar 18 reciprocates rod 20. The rod 20 passes through a stuffing box at the top of the well and extends to pump 22 at the bottom of the well. It will be understood that the pump 22 is deep within the ground and the length of the rod 20 will be at least 10,000 times its diameter. I.e., there is an exceedingly long slender rod extending from the means for reciprocating the rod 20 at the top of the ground to the pump 22 far below the ground.

Cylinder block 24 of piston-cylinder combination 23 is mounted upon the top of the crossbar 18. This cylinder block 24 has two cylinder bores 26 extending from the top. Solid cylindrical pistons 28 are mounted for vertical reciprocation within the bores 26. O-rings 30 at the top of each bore 26 form a liquid tight seal between the bore 26 and the piston 28 which is mounted to reciprocate within the bore 26. Top plate 32 rests upon top of the pistons 28. Of course, the pistons 28 could be attached to the plate 32, but this is not necessary. By not attaching the pistons 28 to the top plate 32 the problem of maintaining the pistons 28 with parallel axis set for the correct spacing for the bores 26 is avoided. Central hole 34 extends through plate 32. Central hole 35 extends through the cylinder block 24. The rod 20 extends through these holes 34 and 35, and through a central hole 36 in the crossbar 18. Clamp 38 is clamped to the rod 20 above the top plate 32. It will be understood that the clamp 38 may be any of several different types which are commonly known to the art and that the particular type illustrated is for illustrative purposes only and not necessarily the type which would be used. The clamp 38 provides a means for transmitting the reciprocating motion from the crossbar 18 to the rod 20, the rod 20 always exerting the downward force through the clamp 38.

At the bottom of each bore 26 there is port 40 which is connected to reservoir 44 by fluid conduit 42. The path of the conduit 42 as shown in FIG. 1 is illustrative and not meant to be limited to a conduit following this path in actual practice.

The reservoir 44 would contain both liquid and gas under pressure. The quantity of gas under pressure may be varied to provide more or less cushion to the rod 20.

The pressure of the gas in reservoir 44 will be dependent upon the weight on rod 20 and upon the number and diameter of the pistons 28 in the piston-cylinder combination 23. In this regard it will be understood that there will be two, three, four or six pistons 28 mounted within a cylinder block 24 of suitable design. As stated the pressure on the gas will be sufficient to maintain the plate 32 above the block 24 at all times. If there is a great amount of gas and not much liquid in the system, there will be much springiness. On the other hand, if there is a great amount of liquid and a small amount of gas there will not be much springiness. To this degree the shock absorber system is very flexible and can be adjusted to suit the needs of the operator. The conduit 42 is connected from the bottom of the reservoir 44 so that if there is any liquid in the reservoir 44 it is connected to the piston-cylinder combination 23. It will be understood of course that the O-rings 30 are more effective against a liquid than against a gas.

A gauge 46 is provided at the top of the reservoir. It will be understood that readings on the gauge or a recorder on valve 48 can be used to determine the amount of power going into the rod 20 by knowing the stroke of the rod and the different pressure readings on the gauge 46.

Also, there is provided valve 48 into the top of the reservoir 44. This valve 48 provides connection for adding gas to the reservoir, or bleeding gas from the reservoir. Also, if there is equipment (e.g., bellows) which can be operated from a pulsating gas system without consuming gas, it may be connected to the valve 48. Also, a pressure switch could be used on valve 48 so as to shut down the well if the pressure at 48 fell below a certain minimum or rose above a maximum. I.e., if for some reason the rod 20 in the well did break then this would be indicated by a very low pressure on the gas as reflected by the gauge 46 and at the valve 48. Therefore, the unit could be shut down in such an event.

Also, at the bottom of the reservoir there is a valve connection 50 by which liquid may be added to the system.

Valve 52 is between the ports 50. By closing valve 52 the liquid may be bled from the piston-cylinder combination 23 by the valved connection 54. It is desirable of course to be able to isolate the reservoir 44 from the piston-cylinder combination 23 for maintenance of one or the other. Also, the valve 52 may be a needle valve and therefore by adjusting the size of opening through valve 52 the springiness of the system can be further adjusted, i.e., if there is a very small opening through valve 52 the system will operate as a "hard" system;

even though there is a large volume of gas in the reservoir 44.

It will be apparent that the embodiment shown is only exemplary and that various modifications can be made in construction, materials, and arrangement within the scope of the invention as defined in the appended claims.

I claim as my invention:

1. In a deep well pump unit having
   (a) a pump deep within the ground,
   (b) a rod extending from the pump to above the ground, and
   (c) means above the ground for vertically reciprocating the rod,
   (d) said means for reciprocating including a horizontal crossbar,
   (e) a shock absorber mounted between and interconnecting the crossbar and rod so that there is relative movement therebetween,
   the improvement comprising:
   (f) the shock absorber containing both liquid and gas, and
   (g) means for changing the quantity of gas in the shock absorber mounted thereon.

2. In a shock absorber for a deep well pump unit having
   (a) a pump deep within the ground,
   (b) a rod extending from the pump to above the ground, and
   (c) means above the ground for vertically reciprocating the rod,
   (d) said means for reciprocating including a horizontal crossbar;
   the improvement comprising:
   (e) a piston-cylinder combination mounted on the crossbar,
   (f) means on the piston-cylinder combination for attaching the rod thereto,
   (g) a liquid in the piston-cylinder combination,
   (h) a reservoir containing
   (i) liquid and gas, and
   (j) a conduit connecting to the bottom of the reservoir to the piston-cylinder combination.

3. In a deep well pump unit having
   (a) a pump deep within the ground,
   (b) a rod extending from the pump to above the ground, and
   (c) means above the ground for vertically reciprocating the rod,
   (d) said means for reciprocation including a horizontal crossbar;
   the improvement comprising:
   (e) a cylinder block seated on top the crossbar,
   (f) said block having at least two cylindrical bores from the top,
   (g) a piston reciprocally mounted in each bore,
   (h) each piston in fluid sealing relationship to its bore,
   (i) a top plate over the cylinder block and pistons,
   (j) the plate and block having a hole extending through each,
   (k) said rod extending through the hole in the plate and block,
   (l) a clamp on the rod on top the plate, and
   (m) a fluid port in the block at the bottom of each bore to provide means for connecting the cylinders to a reservoir of fluid.

4. The invention as defined in claim 3 with the addition of
   (n) a reservoir mounted on the pump unit,
   (o) conduits interconnecting to the bottom of the reservoir and the ports, and
   (p) liquid and gas under pressure in the reservoir.

References Cited by the Examiner

UNITED STATES PATENTS

| | | | |
|---|---|---|---|
| Re. 20,287 | 3/27 | Patterson | 267—1 |
| 1,002,821 | 9/11 | Cowles et al. | 267—64 |
| 1,307,243 | 6/19 | Cousins | 74—581 |
| 1,504,490 | 8/24 | Mason | 267—1 |
| 1,692,227 | 11/28 | Segeler | 267—164 |
| 1,903,775 | 4/33 | Christopher | 267—1 |
| 2,259,019 | 10/41 | Carr et al. | 267—1 |
| 2,892,947 | 6/59 | Emanuelson | 267—1 |
| 3,021,794 | 2/62 | Knox | 103—202 |

LAURENCE V. EFNER, *Primary Examiner.*

ABRAHAM G. STONE, *Examiner.*